(12) United States Patent
Toyozawa et al.

(10) Patent No.: US 6,903,527 B2
(45) Date of Patent: Jun. 7, 2005

(54) SERVO CONTROLLER

(75) Inventors: Yukio Toyozawa, Kumamoto (JP); Kazuomi Maeda, Kumamoto (JP)

(73) Assignee: Fanuc LTD, Yamanashi (JP)

( * ) Notice: Subject to any disclaimer, the term of this patent is extended or adjusted under 35 U.S.C. 154(b) by 0 days.

(21) Appl. No.: 10/753,409

(22) Filed: Jan. 9, 2004

(65) Prior Publication Data
US 2004/0150363 A1 Aug. 5, 2004

(30) Foreign Application Priority Data

Jan. 21, 2003 (JP) ........................................ 2003-012495

(51) Int. Cl.[7] .............................. G25J 9/22; G25B 19/42
(52) U.S. Cl. ............................ 318/568.13; 318/568.22; 318/568.23; 318/632; 700/188; 700/245; 369/44.34; 369/47.42
(58) Field of Search .................................. 318/560, 561, 318/570–573, 568.1, 568.13, 568.22, 568.23, 632; 700/188, 245; 369/44.34, 47.42

(56) References Cited

U.S. PATENT DOCUMENTS

| | | | | |
|---|---|---|---|---|
| 5,019,763 A | * | 5/1991 | Komatsu | 318/571 |
| 5,773,938 A | * | 6/1998 | Seong et al. | 318/6 |
| 5,907,450 A | * | 5/1999 | Ishikawa | 360/78.09 |
| 6,107,771 A | * | 8/2000 | Maeda | 318/630 |
| 6,650,499 B1 | * | 11/2003 | Kusumoto | 360/77.04 |
| 6,697,711 B2 | * | 2/2004 | Yokono et al. | 700/245 |
| 2003/0016607 A1 | * | 1/2003 | Cho et al. | 369/47.42 |
| 2003/0053383 A1 | * | 3/2003 | Watanabe | 369/44.34 |
| 2003/0090230 A1 | * | 5/2003 | Fujibayashi et al. | 318/625 |
| 2003/0144764 A1 | * | 7/2003 | Yokono et al. | 700/245 |
| 2004/0059460 A1 | * | 3/2004 | Endo | 700/188 |
| 2004/0145333 A1 | * | 7/2004 | Toyozawa et al. | 318/632 |

FOREIGN PATENT DOCUMENTS

| | | | |
|---|---|---|---|
| JP | 6-309021 | 11/1994 | |
| JP | 7-104823 | 4/1995 | |
| JP | 10268916 A | * 10/1998 | ......... G05B/19/404 |

* cited by examiner

*Primary Examiner*—Paul Ip
(74) *Attorney, Agent, or Firm*—Staas & Halsey LLP

(57) ABSTRACT

A switch is turned on by a learning control start command from a master control unit, and the positional deviation at respective cycles is read in. Correction data read out from a learning memory is added to the positional deviation, and the result is filtered by band limiting filter and then stored in the learning memory as correction data. The correction data read out from the memory is compensated for phase delay, fall in gain, and the like, by a dynamics compensating element, and is added to the positional deviation and input to a positional control section. When the command pattern for the same shape is completed, and a learning control end command is output, whereupon the switch is turned off and learning control terminates.

16 Claims, 6 Drawing Sheets

SERVO CONTROLLER

BACKGROUND OF THE INVENTION

1. Field of the Invention

The present invention relates to a servo controller for driving a feed shaft of a drive mechanism, such as a machine tool, injection molding machine, pressing machine, or the like, and more particularly, to a servo controller suitable for use in cases where the same type of component is to be processed any number of times by a machine tool for processing components.

2. Description of the Related Art

Learning control is already known as a method for increasing processing accuracy and causing control deviation to converge to zero, in cases where processing, or the like, is carried out by repeatedly instructing the same pattern of commands. In the learning control implemented in the prior art, as illustrated in FIG. 2, the same pattern is instructed repeatedly at a uniform pattern cycle, correction data determined on the basis of the positional deviation at each of the control intervals in the previous pattern cycle is stored in a learning memory, and the correction data for each control interval in the previous pattern cycle stored in the learning memory is added to the positional deviation at each of the control intervals of the current pattern cycle, thereby causing the positional deviation to converge to zero (see, for example, Japanese Patent Application Laid-open No. 7-104823 and Japanese Patent Application Laid-open No. 6-309021).

If the cross-sectional shape has the same pattern, and the commands for this same pattern are issued repeatedly, as in a piston lathe, then the learning control described above can be implemented, but if the same pattern is not implemented repeatedly, then learning control of this kind cannot be applied.

In case where many components of the same type are to be processed consecutively, or in case where the same processing shape must be processed at intermittent intervals, many times, learning control has not been applicable, regardless of the fact the commands are of the same pattern because of processing of the same shape.

SUMMARY OF THE INVENTION

The servo controller according to a first aspect of the present invention drives a servo motor on the basis of command positions input by a master control unit, and comprises: learning control means for creating correction data on the basis of the positional deviation in the same command pattern, storing the data in a memory, and correcting positional deviation. The learning control means creates correction data on the basis of the positional deviation, and corrects the positional deviation, during the period from a learning control start command to a learning control end command.

The servo controller according to a second aspect of the present invention drives a servo motor on the basis of commands input by a master control unit and comprises: learning control means which has a memory for storing correction data determined on the basis of the positional deviation between a command position input from the master control unit and a detected position of a drive object driven by the servo motor, and performs learning control by correcting the positional deviation on the basis of the correction data stored in the memory. The learning control means judges a learning control start command and a learning control end command input by the master control unit, and stores in the memory the correction data for each prescribed cycle in the driving operation of the servo motor during the period from the learning control start command to the learning control end command, and performs learning control of the drive of the servo motor in the period from the learning control start command until the learning control end command, on the basis of positional commands input from the master control unit and the correction data for each of the prescribed cycles stored in the memory.

The servo controller according to the first or second aspect of the present invention may incorporate the following aspects.

The learning control means performs learning control from the time when the movement command, which is the differential of the positional commands, ceases to be 0, after the learning start command, until the learning end command.

The learning control means comprises respective memories corresponding to a plurality of processing shapes, and in accordance with an identification code specifying the processing shape from the master control unit, and a learning control start command and a learning control end command, learning control is performed from the learning control start command to the learning control end command, by selecting a memory by means of the identification code.

The memory is a non-volatile memory.

The correction data stored in the memory can be transferred, to and from a storage device of the master control unit.

The correction data stored in the memory can be cleared by a command from the master control unit.

Updating of the correction data alone can be halted by means of a command from the master control unit.

Updating of the correction data is halted when the positional deviation has come within a prescribed range.

The master control unit is informed of the fact that the positional deviation has exceeded a predetermined value.

It is judged that the motor capacity has been exceeded if the current command has exceeded a predetermine value, informing the master control unit of the fact.

The master control unit stores the correction data in association with an operating program specified by the learning control start command and the learning control end command, and transfers correction data corresponding to the set of a learning control start command and learning control end command output by the master control device, to the memory of the servo controller.

The master control unit stores the correction data in association with an operating program specified by means of the learning control start command and the learning control end command, and clears the correction data in the memory if there is no positional deviation data corresponding to the set of a learning control start command and learning control end command input from the master control device.

The operating program is an NC program for processing a workpiece in a machine tool.

The master control unit previously interpolates positional command values for each axis and stores same in storing means, and outputs the positional command values stored in the storing means, to the servo controller.

The interpolation calculations are previously carried out by a computing device external to the master control unit, and the master control unit outputs the positional command values to the servo controller whilst receiving same from a communications device.

According to the present invention, it is possible to provide a servo controller whereby learning control can be applied, even in cases where the same shape is processed any number of times.

BRIEF DESCRIPTION OF THE DRAWINGS

The aforementioned object and other objects and features of the present invention shall become apparent from the following description of the embodiments, with reference to the accompanying drawings, wherein.

DESCRIPTION OF THE PREFERRED EMBODIMENTS

Figure 1:
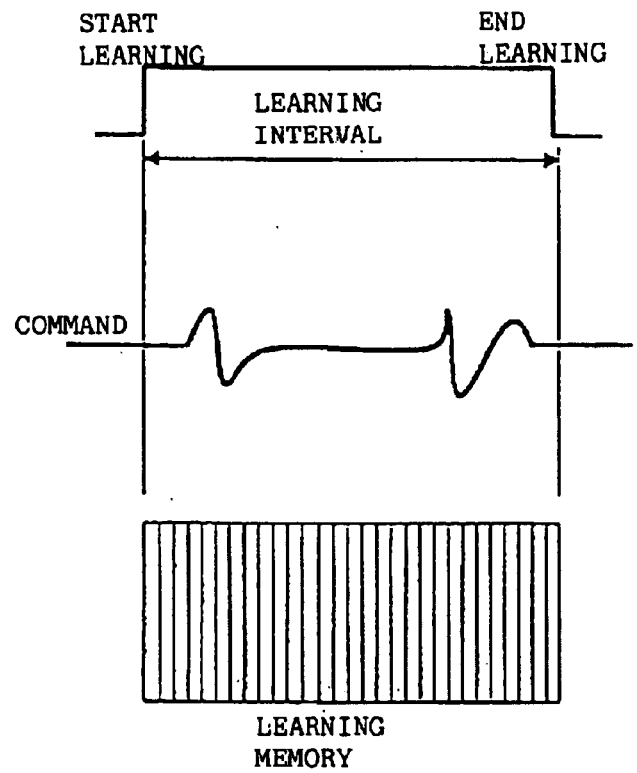
FIG. 1 is a diagram for describing the principles of the present invention.

FIG. 1 is a principle diagram of the present invention. According to the present invention, learning control is applied to components or processing points in which the same shape is processed, a learning control start command being issued from the position at which the same command pattern is to be instructed, and a learning control end command being issued at the position where the same command pattern ends. By implementing learning control only during the period from the learning control start command to the learning control end command, a plurality of components of the same type are processed, or a workpiece is processed in such a manner that processing of the same shape is carried out a plurality of times.

Figure 2:
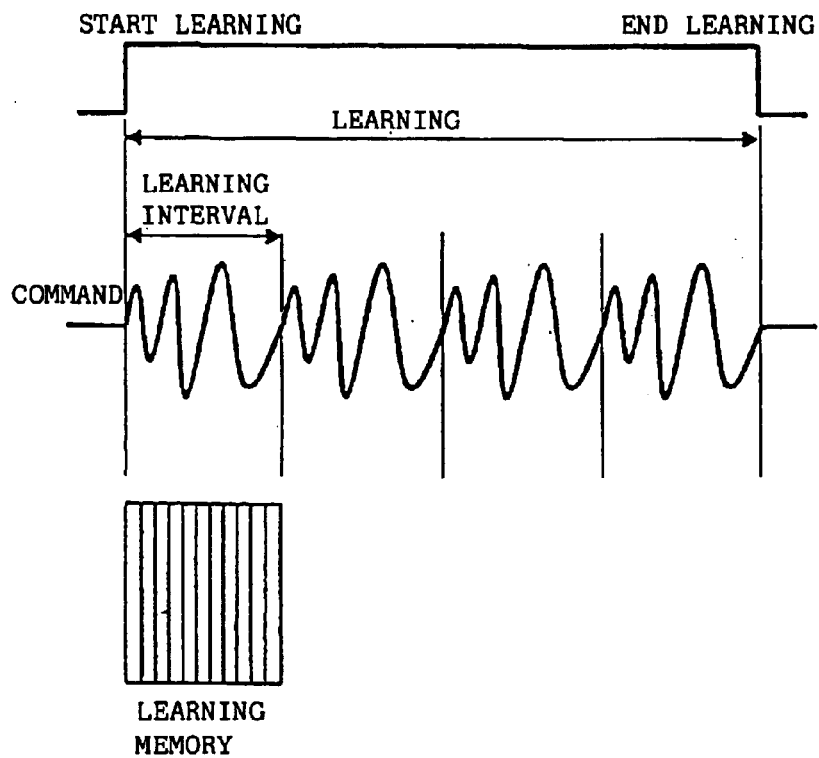
FIG. 2 is an illustrative diagram of conventional learning control (repeated control)

In the conventional learning control illustrated in FIG. 2, correction data consisting of positional deviation data for one pattern cycle of the same command pattern that is to be repeated is stored in a learning memory, and in the next pattern cycle, control is implemented by adding the correction data stored in the learning memory to the positional deviation, in such a manner that the positional deviation becomes zero.

In the present invention, the correction data consisting of positional deviation data for the learning interval from the learning control start command until the learning control end command during which the same command pattern is instructed, is stored in a learning memory, and during the learning interval from the next learning control start command to the next learning control end command, the positional deviation is corrected by means of the corresponding correction data stored in the learning memory, in addition to which, new correction data is stored in the learning memory.

Figure 3:
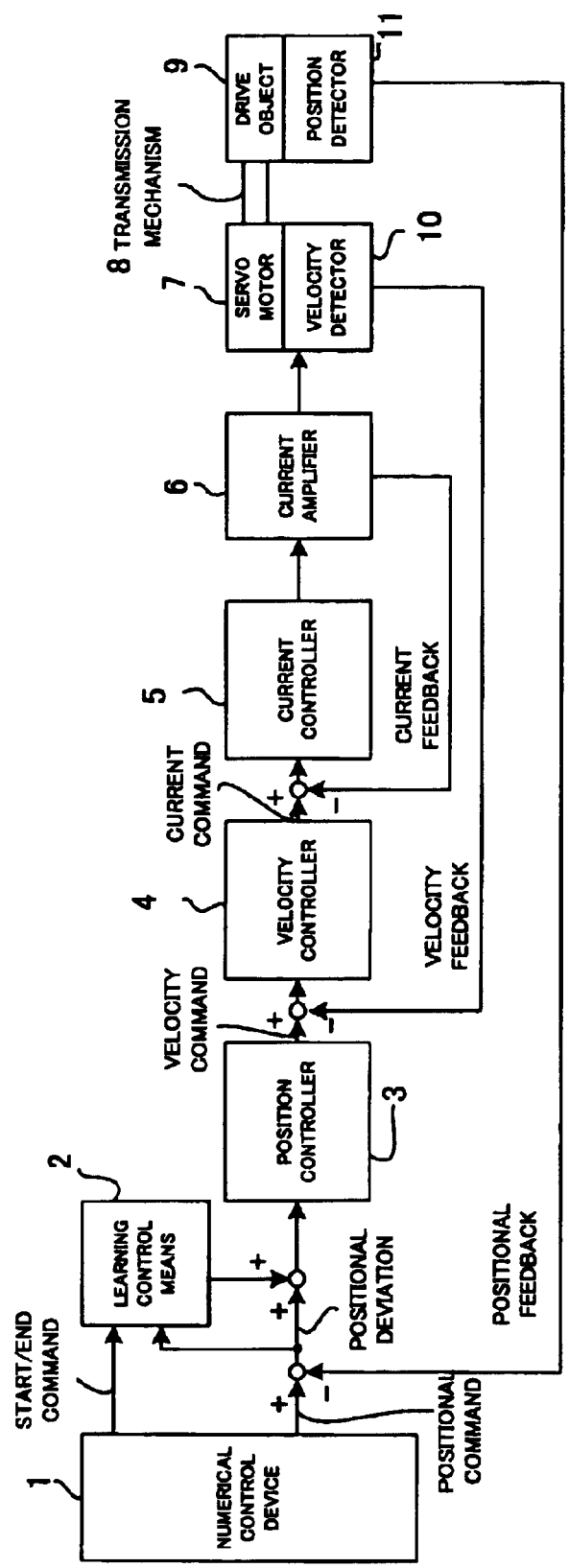
FIG. 3 is a principal block diagram of one embodiment of a servo controller according to the present invention.

FIG. 3 is a principal part block diagram showing one embodiment of the present invention. A numerical control device 1 of a master control unit outputs positional commands to the servo control section of a servo motor 7 which drives and controls a drive object 9, on the basis of a processing program, or the like. Meanwhile, the servo control section drives and controls the servo motor 7 by performing feedback control of the position, velocity and current, on the basis of these positional commands.

In other words, a positional deviation is determined by subtracting the current position, as fed back by a position detector 11 which detects the movement position of the drive object 9, from the positional command output by the numerical control device 1. A positional control section 3 then determines a velocity command by multiplying this positional deviation by a positional loop gain. Moreover, a velocity deviation is determined by subtracting the actual velocity, as fed back by a velocity detector 10 which is attached to the servo motor 7 and detects the velocity of the servo motor 7, from the velocity command, and a velocity control section 4 then determines a current command (torque command) by performing velocity loop control, such as PI (proportional-plus-integral) control, or the like. Moreover, a current deviation is determined by subtracting the drive current, as fed back by a current amplifier 6, from the current command, and a current control section 5 performs current loop control and drives and controls the servo motor 7 by means of the current amplifier 6, whereby the drive object 9 is driven via a transmission mechanism 8.

In the foregoing, the servo control section is the same as one implemented conventionally for performing loop control of position, velocity and current, and in this respect it does not differ from the prior art. The point of difference is that learning control means 2 is incorporated. The learning control means 2 starts learning control at a learning control start command from the numerical control device 1, and terminates learning control at a learning control end command.

Figure 4:
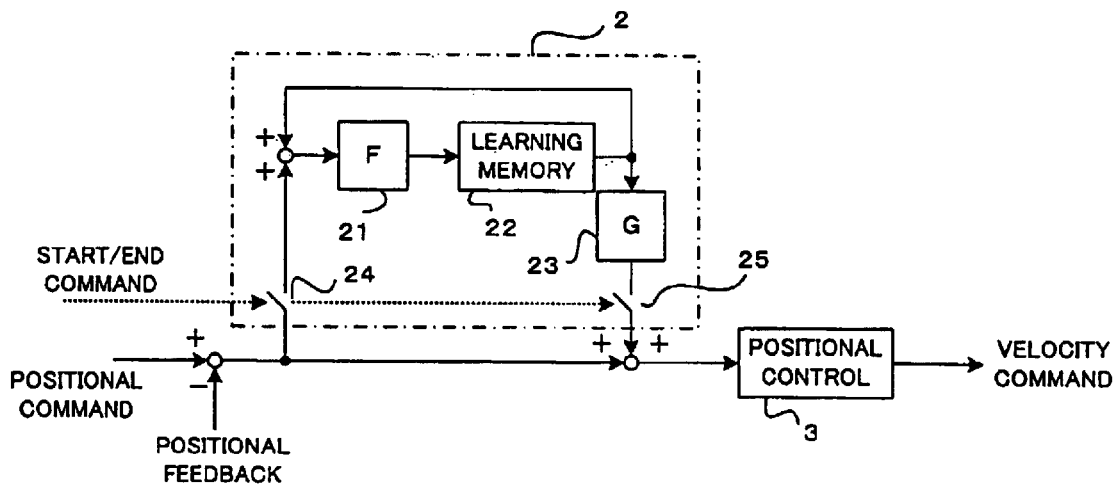
FIG. 4 is a detailed block diagram of learning control means according to the embodiment shown in FIG. 1.

FIG. 4 is a detailed block diagram of the learning control means 2. Similarly to a conventional learning control means, the learning control means 2 comprises a band limiting filter 21, a learning memory 22 for storing correction data, and a dynamics compensating element 23 for compensating for phase delay, fall in gain, or the like, in the control object. Moreover, a characteristic feature of the present invention is that switches 24, 25 for starting and ending learning control are provided.

In the learning memory 22, there are provided a number of memories corresponding to the prescribed cycle at which positional and velocity loop control is to be performed within the same command pattern that is to be learned. The prescribed cycle may be established together with the learning start command, or if the prescribed cycle is not established, then a sufficient value is established for the first learning operation, and the prescribed cycle is then determined by the time period between the first start command and end command (the number of counts of a prescribed processing cycle). Furthermore, when transferring correction data to or from the memory device of the master control unit, the prescribed cycle can also be transferred simultaneously. For example, if the section of the same command pattern is taken to be L and the cycle of the position and velocity loop processing is taken to be T, then the number of memories provided in the learning memory 22 will be L/T.

When a learning control start command is output by the numerical control device 1, the switches 24 and 25 close, the positional deviation at each prescribed cycle for performing position and velocity loop control is introduced into the learning control means 2, the oldest correction data stored in the learning memory 22 is added to this positional deviation, and the data is then passed through the band limiting filter 21 and stored in the learning memory 22 as correction data. Moreover, the oldest correction data extracted from the learning memory 22 as described above is added to the positional deviation via the switch 25, after the phase delay, fall in gain, and the like, of the control object have been compensated by the dynamics compensating element 23. The positional deviation to which the correction data has been added is input to the position control device 3, and a velocity command is determined by multiplying this by a positional loop gain. This processing operation is carried out thereafter, until the commands of the same command pattern have finished, and a learning control end command is output by the numerical control device 1, thereby turning the switches 24 and 25 off. In this way, correction data for each processing cycle of position and velocity control in the section of the same command pattern is stored in the learning memory 22.

In the section of the same command pattern, the positional deviation is made to converge to zero as the correction data is added to the positional deviation.

The learning control start command and learning control end command output by the numerical control device 1 should be given an M code which specifies the command, in such a manner that they can be written into a processing program. For example, if the M code of the learning control start command is set as Mxx, and the M code of the learning control end command is set as Myy, then the processing program should be written as follows.

G00 X . . . Y . . .
Mxx
G01 X . . . Y . . .
G02 X . . . Y . . .
Myy

Moreover, the learning control start command and the learning control end command may be composed by means of signals from an external source, such as a PC (programmable controller), or the like, which performs sequence control.

Furthermore, rather than closing the switches 24 and 25 immediately after the learning control start command has been output, it is also possible to adopt a composition which allows the switches 24, 25 to be closed and learning control to be started, from the moment that the movement command, which is the differential of the positional commands, ceases to be zero. By this means, it is possible to adjust the timing from the issuing of the learning control start command until actual output of the positional command, in each cycle.

Figure 5:
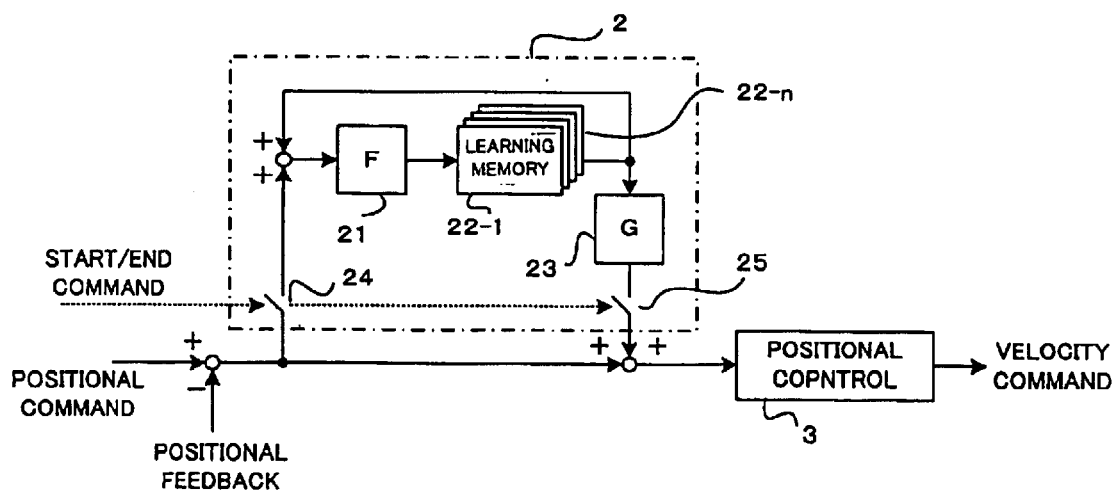
FIG. 5 is a detailed block diagram of learning control means according to a further embodiment, separate to the learning control means illustrated in FIG. 4.

Furthermore, if the components to be processed involve a plurality of shape patterns of different shapes, then as illustrated in FIG. 5, it is possible to provide learning memories 22-1 to 22-n for each shape, in such a manner that learning control can be implemented for each shape. In this case, using the type of description such as "M05 Q1 N2", learning control may be indicated by M05, the start of the learning control may be indicated by Q1, and a second shape (second learning memory) may be specified by N2, or the like. In this manner, the learning control means 2 selects the learning memory 22-1 to 22-n corresponding to the command pattern of the processing shape, when the learning control start command is issued, and the correction data is stored in the selected memory and is output.

Figure 6:
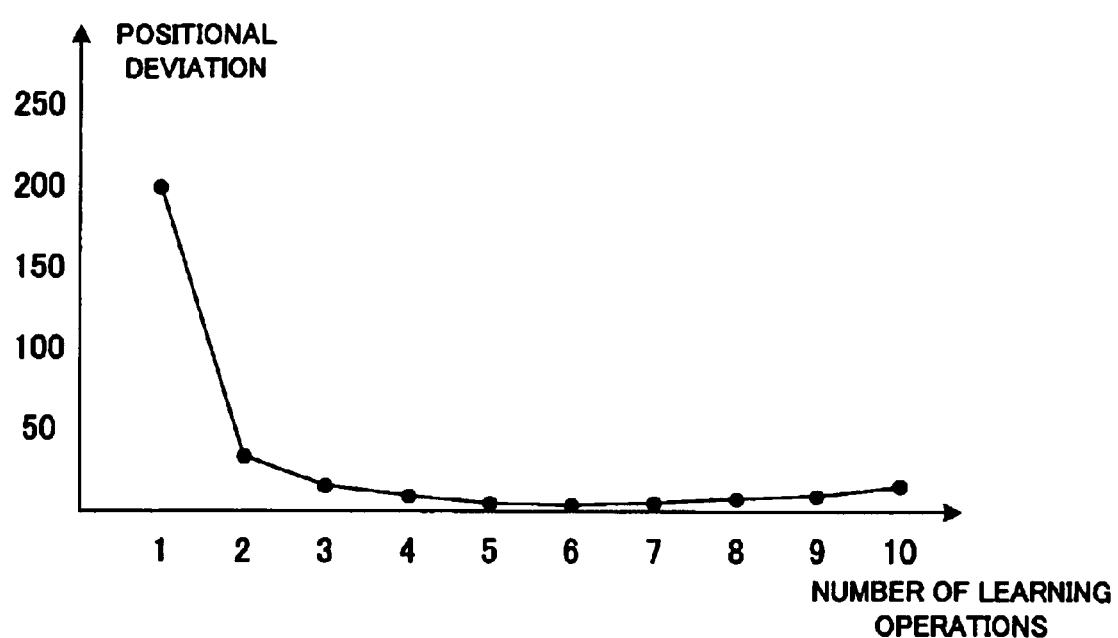
FIG. 6 is a graph showing the relationship between the number of learning operations and the positional deviation.

Moreover, as the number of learning operations increases, the positional deviation may gradually increase, due to the effects of the processing commands, disturbance during cutting, or the like. FIG. 6 is a graph showing the relationship between the number of learning operations and the mean positional deviation. As FIG. 6 reveals, in this case, the mean positional deviation is a minimum when the number of learning operations is 5 or 6. Consequently, when the fifth learning operation is reached, a correction data update halt command is issued by the numerical control device 1 of the master control unit, thereby turning off the switch 24 on the positional deviation input side and halting the updating of the learning memory 22, in such a manner that only output of correction data is performed.

Moreover, it is also possible to adopt a composition wherein updating of the learning memory is halted when the positional deviation has reached a previously determined upper limit value or less, or if it is within a range between an upper limit value and a lower limit value.

Figure 7:
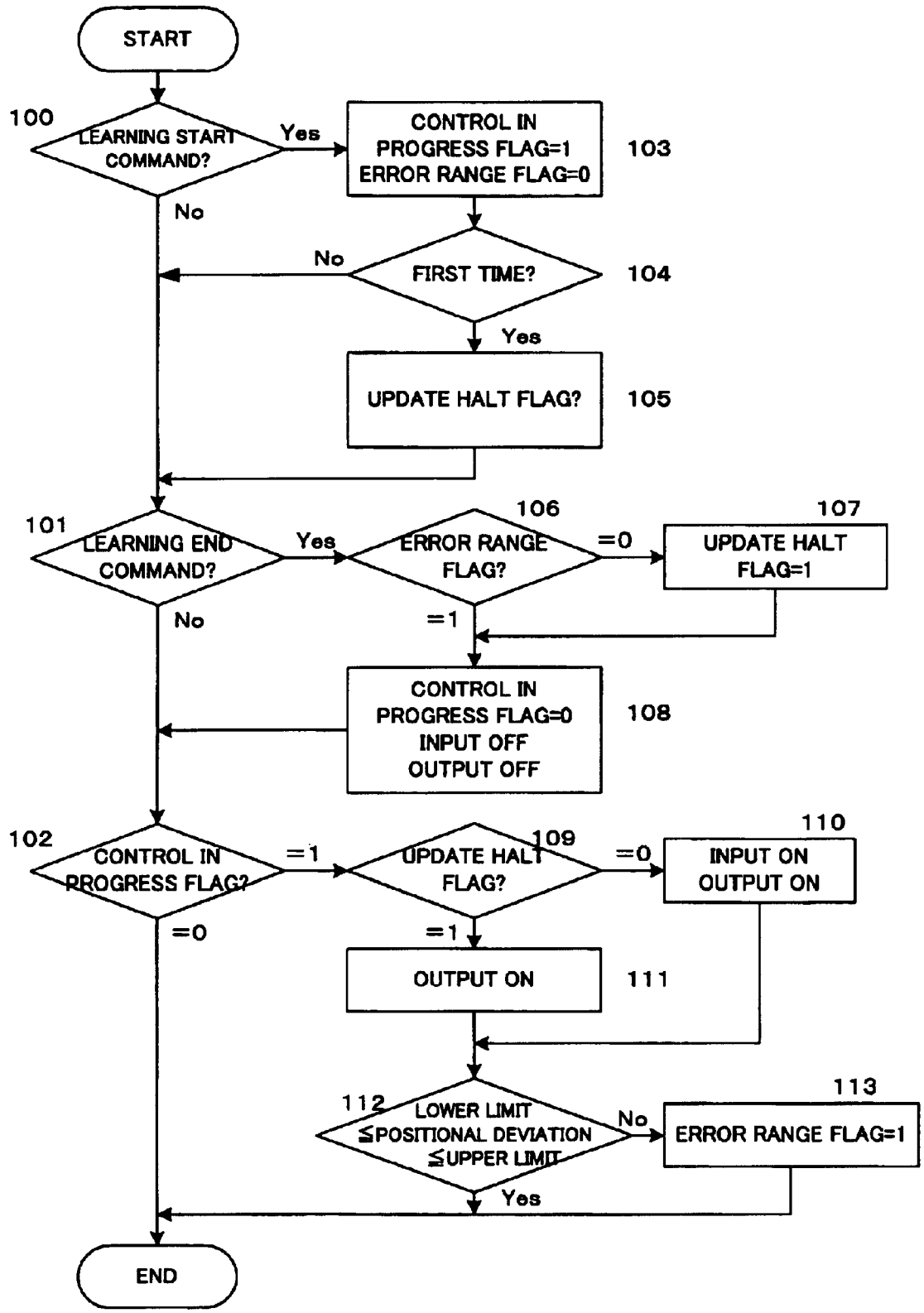
FIG. 7 is a flowchart showing the processing implemented by the learning control means for halting the updating of the learning memory when the positional deviation has come within a range between an upper limit value and a lower limit value.

FIG. 7 is a flowchart of the processing performed by the processor implementing learning control (a processor executing the processing of the servo controller or a dedicated processor of the learning control means) at each sampling cycle for sampling the positional deviation (at each position and velocity loop processing cycle), whereby updating of the learning memory is halted if the positional deviation is in a range between an upper limit and a lower limit value.

Firstly, it is determined whether or not a learning control start command has been input from the numerical control device 1 (step 100), whether or not a learning control end command has been input (step 101), and whether or not the flag indicating that learning control is in progress has been set to "1" (step 102). If a learning control start command has been input, then the flag indicating learning control in progress is set to "1", and the error range flag is set to "0" (step 103).

Thereupon, it is judged whether or not this learning control start command is an initial command (step 104). In other words, it is judged whether or not this command has been issued for the first time, by determining whether or not correction data has been stored in the learning memory 22. If it has been issued for the first time, then the update halt flag is set to "0" (step 105).

In the example shown in FIG. 8 where learning control starts as soon as the movement command ceases to be "0", a learning start flag is set to "0" at step 105, as described hereinafter.

Figure 8:
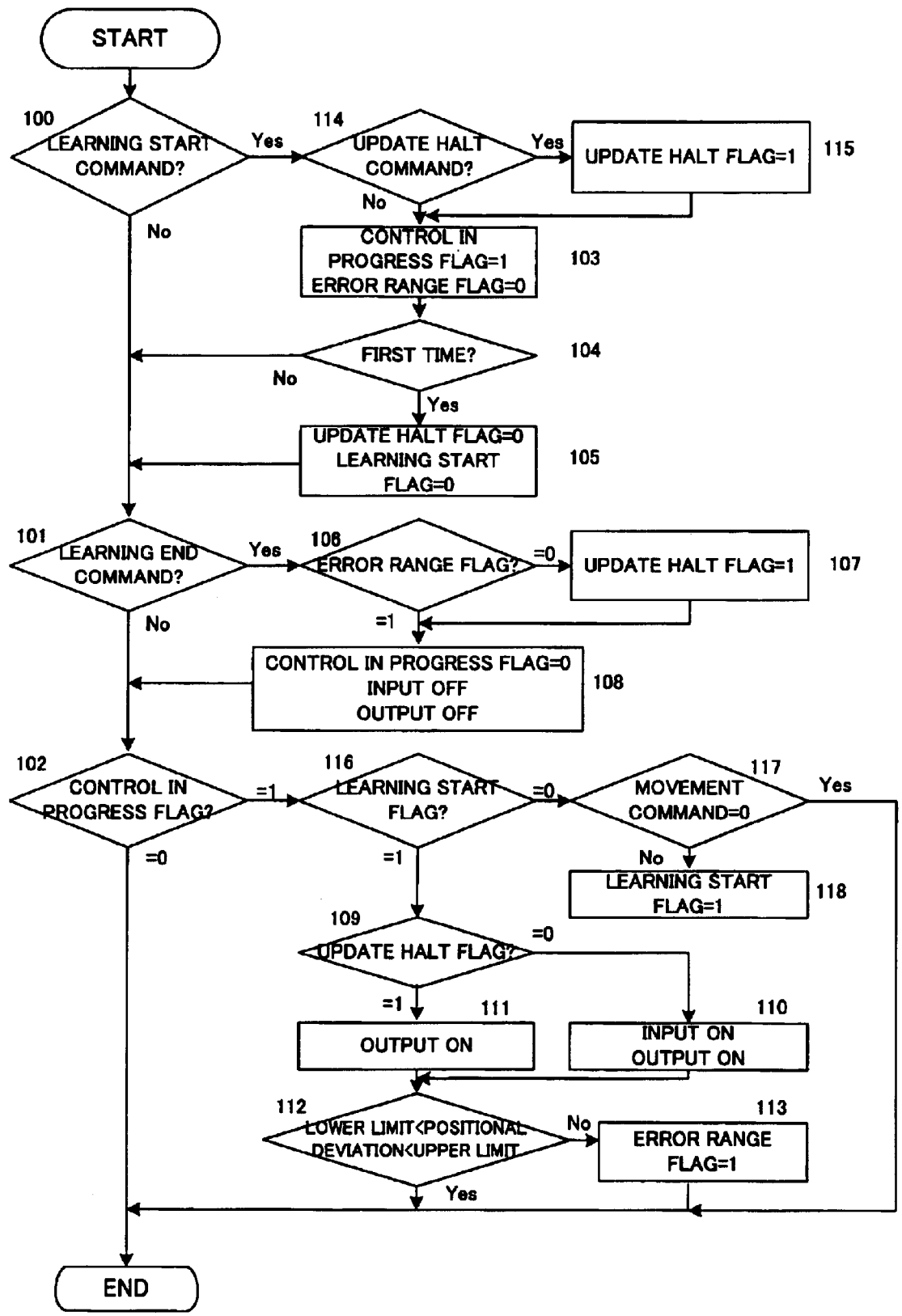
FIG. 8 is a flowchart showing processing for starting learning control when the movement command is any value other than zero.

Moreover, as illustrated in FIG. 8, if a learning start command is input, then firstly, it is determined whether or not an update halt command has been input (step 114), and if an update halt command has been input, then the update halt flag is set to "1" (step 115), whereby updating of the correction data can be halted.

At step 102, if it is judged that the flag indicating that learning control is in progress is set to "1", it is determined whether or not the updating halt flag is set to "0" (step 109). Firstly, as the flag has been set to "0" at step 105, then the sequence advances to step 110, where the input of positional deviation is switched on, and the output of correction data is also switched on (step 110). In other words, the switches 24 and 25 shown in FIG. 2 and FIG. 3 are switched on and learning control is started. It is then judged whether or not the positional deviation read in lies within the range between a previously established upper limit value and lower limit value (step 112), and if it does not lie within this range, then the error range flag is set to "1" (step 113), whereas if it lies within this range, then the processing for this cycle is terminated, without the error range flag being set to "1".

Moreover, as illustrated in FIG. 8, after determining that the flag indicating that learning control is in progress is set to "1", at step 102, it is judged whether or not learning has started, by means of the learning start flag (step 116). If learning has not started, then it is determined whether or not the movement command, which is the differential of the positional commands, is 0 (step 117), and if the movement command is 0, then this processing is terminated, whereas if the movement command is not 0, then the learning start flag is set to "1" (step 118), whereupon judgement of the update halt flag is carried out similarly to the foregoing description. Moreover, if learning has started, then in this case also, judgement of the update halt flag is carried out, in a similar manner. By appending such a learning start flag, it is possible to carry out learning control at the same timing in each cycle after the learning start command, even if an end command is issued before a movement command is output.

From the next cycle, the processing in steps 100, 101, 102, 109, 110 and 112, and also the processing in step 113, is implemented, and if the positional deviation does not lie in the range between the lower limit value and the upper limit value, on any one occasion, then the error range flag is set to "1".

When one command pattern has finished and a learning control end command has been input, the procedure advances from step 101 to step 106, it is judged whether the error range flag is set to "0" or "1", and if it is "1" (if the positional deviation does not lie in the range between the lower limit value and the upper limit value), then the control in progress flag is set to "0", the input and output are switched off (the switches 24 and 25 in FIG. 2 and FIG. 3 are turned off), and learning control is halted. Furthermore, if the error range flag is "0", then the update halt flag is set to "1" (step 107), and the sequence advances to step 108.

When the next learning control start command is input, since it is not the first time for this command, the processing in steps 100, 103, 104, 101, 102, 109–113, and 106–108 is carried out.

Initially, the positional deviation often lies outside the range between the lower limit value and the upper limit value, and therefore the error range flag is set to "1", as a result of which, the update halt flag is not set to "1". Thereupon, as the number of learning control operations increases, so the positional deviation becomes smaller, and accordingly, the positional deviation is no longer judged to lie outside the range between the lower limit value and the upper limit value at step 112, and as a result, the commands for one pattern terminate, without the error range flag being set to "1".

When a learning control end command is read in, it is judged at step 106 that the error range flag is "0", and the sequence proceeds to step 107, where the update halt flag is set to "1", and the control in progress flag is set to "0", in addition to which the input and output are switched off and learning control is halted (step 108), thereby terminating the processing for the current cycle.

When the next learning control start command is read in, since the update halt flag has been set to "1", the sequence advances from step 109 to step 111, and only the output is switched on. In other words, only switch 25 in FIG. 2 and FIG. 3 is turned on, and hence only correction of the positional deviation by means of the correction data is carried out, without the correction data in the learning memory 22 being updated. The sequence then advances to step 112.

In this way, thereafter, even if a learning control start command is input and learning control is started, since the update halt flag is set to "1", the correction data in the learning memory 22 is not updated, and learning control is only performed by correcting the positional deviation by means of the correction data.

The learning memory 22 is generally constituted by a volatile memory, such as an SRAM, DRAM, or the like, and when the power supply to the numerical control device 1 of the master control unit is switched off, the contents thereof are erased. Consequently, by constituting the learning memory 22 by means of a non-volatile memory, such as a flash memory, or the like, then the correction data can be stored, even if the power supply is switched off, and hence control can be performed from the previous state, without having to undertake learning operations again.

Moreover, the correction data stored in the learning memory whereby the positional deviation has become "0", as a result of a learning operation, is highly valuable information. Therefore, the memory contents of the learning memory 22 can be transferred to the numerical control device 1 of the master control unit and stored in a non-volatile memory, or the like, and thereupon, when a separate workpiece, or the like, is to be processed, or when a similar component, or the like, is to be processed in the same shape, then by transferring the stored correction data to the learning memory 22, it is possible to implement correction of the positional deviation by means of the correction data only, without performing learning again.

In this way, if the correction data stored in the learning memory is transferred to a non-volatile memory of the master control unit 1 and stored therein, then it is not necessary to constitute the learning memory 22 by means of a non-volatile memory. Correction data created such that the positional deviation converges to "0" by means of learning control, for each type of component and each processing shape, or, in association with an operating program specified by a learning control start command and/or a learning control end command, is stored the numerical control device 1 of the master control unit. Thereupon, when processing is to be carried out, the correction data is transferred from the learning memory 22 and stored, and highly accurate processing can be carried out, by causing the master control unit to implement correctional processing of the positional deviation only, by means of the correction data.

When a new processing shape is to be processed in a workpiece, then if correction data has not yet been created by learning control, and there exists no correction data stored in accordance with the operating program corresponding to that processing shape, then the learning memory 22 is cleared by a command from the numerical control device 1 which is a master control unit, and new correction data is created for the pattern of the new processing shape.

Furthermore, in the embodiment described above, after the update halt flag has been set to "1", the output is switched on at step 111, and the procedure changes to processing for adding correction data to the positional deviation, whereupon the procedure advances to step 112. This is because, during control for adding correction data to the positional deviation, if the positional deviation has moved outside the range between the lower limit value and the upper limit value, then the error range flag is set to "1", in such a manner that an alarm, or the like is output, and an operator is informed of the fact that the positional deviation is not within the prescribed range, due to tool wear or other such reasons, thereby letting operators know immediately of any processing faults.

Moreover, the fact that an abnormality of some kind has occurred can be informed when a previously determined current command is exceeded due to the command acceleration, or cutting load, or the like, monitoring the current command during learning.

Furthermore, if a processing program is written in standard NC code, then the numerical control device 1 interprets this processing program and performs interpolation, but since this must be carried out in real time, then the interval that can be interpolated is determined by the calculational capacity of the numerical control device 1. The numerical control device 1 may previously interpolate the positional command values for each axis and store these values in a memory, in such a manner that the positional command values stored in this memory are then output to the servo controller. Moreover, if the calculations are performed by a separate computing device which is external to the numerical control device 1 forming the master control unit, then the numerical control device 1 can input these positional commands to the servo controller whilst receiving them from a communications device, and hence the interpolation interval can be shortened and processing speed can be increased.

As described above, according to the present invention, if a plurality of pieces are to be processed with the same shape, then learning control can be applied to that shape portion only, and processing can be carried out in such a manner that the positional deviation in this processing converges to zero, thereby making it possible to achieve highly accurate processing.

What is claimed is:

1. A servo controller for driving a servo motor on the basis of command positions input by a master control unit, comprising:
    learning control means for creating correction data on the basis of a positional deviation in a same command pattern, storing said data in a memory, and correcting positional deviation;
    wherein said learning control means creates correction data on the basis of the positional deviation, and corrects the positional deviation, during the period from a learning control start command to a learning control end command.

2. A servo controller for driving a servo motor on the basis of commands input by a master control unit, comprising:
    learning control means which has a memory for storing correction data determined on the basis of a positional deviation between a command position input from the master control unit and a detected position of a drive object driven by the servo motor, and performs learning control by correcting the positional deviation on the basis of the correction data stored in said memory;
    wherein said learning control means judges a learning control start command and a learning control end command input by the master control unit, and stores in said memory said correction data for each prescribed cycle in the driving operation of said servo motor during the period from said learning control start command to said learning control end command, and performs learning control of the drive of said servo motor in the period from said learning control start command until said learning control end command, on the basis of positional commands input from said master control unit and the correction data for each of said prescribed cycles stored in said memory.

3. The servo controller according to claim 1, wherein said learning control means performs learning control from the time when the movement command, that is the differential of the positional commands, ceases to be 0, after said learning start command, until the learning end command.

4. The servo controller according to claim 1, wherein said learning control means comprises a plurality of memories corresponding respectively to a plurality of processing shapes, and in accordance with an identification code specifying said processing shape, a learning control start command and a learning control end command from said master control unit, learning control is performed from the learning control start command to the learning control end command, by selecting a memory by means of the identification code.

5. The servo controller according to claim 1, wherein said memory is a non-volatile memory.

6. The servo controller according to claim 1, correction data stored in said memory can be transferred to and from a storage device of said master control unit.

7. The servo controller according to claim 1, wherein the correction data stored in said memory can be cleared by a command from said master control unit.

8. The servo controller according to claim 1, wherein updating of the correction data alone can be halted by means of a command from said master control unit.

9. The servo controller according to claim 1, wherein updating of the correction data is halted when said positional deviation has come within a prescribed range.

10. The servo controller according to claim 1, wherein said master control unit is informed of the fact that said positional deviation has exceeded a predetermined value.

11. The servo controller according to claim 1, wherein it is judged that the motor capacity has been exceeded if the current command has exceeded a predetermine value, informing said master control unit of the fact.

12. The servo controller according to claim 1, wherein said master control unit stores said correction data in association with an operating program specified by said learning control start command and said learning control end command, and transfers correction data corresponding to the set of a learning control start command and learning control end command output by the master control device, to said memory of the servo controller.

13. The servo controller according to claim 1, wherein said master control unit stores said correction data in association with an operating program specified by means of said learning control start command and said learning control end command, and clears the correction data in said memory if there is no positional deviation data corresponding to the set of a learning control start command and learning control end command input from the master control device.

14. The servo controller according to claim 1, or claim 2, wherein said operating program is an NC program for processing a workpiece in a machine tool.

15. The servo controller according to claim 1, wherein said master control unit previously interpolates positional command values for each axis and stores same in storing means, and outputs the positional command values stored in said storing means, to said servo controller.

16. The servo controller according to claim 15, wherein said interpolation calculations are previously carried out by a computing device external to said master control unit, and said master control unit outputs said positional command values to said servo controller whilst receiving same from a communications device.

* * * * *

UNITED STATES PATENT AND TRADEMARK OFFICE
CERTIFICATE OF CORRECTION

PATENT NO.    : 6,903,527 B2
DATED         : June 7, 2005
INVENTOR(S)   : Yukio Toyozawa et al.

It is certified that error appears in the above-identified patent and that said Letters Patent is hereby corrected as shown below:

Column 10,
Line 52, after "claim 1" delete ",".

Signed and Sealed this

Seventh Day of March, 2006

JON W. DUDAS
*Director of the United States Patent and Trademark Office*